United States Patent
Williford et al.

(10) Patent No.: US 11,984,710 B2
(45) Date of Patent: May 14, 2024

(54) AUTOMATIC SECONDARY PLUG FOR INTEGRATED RACKING ON BREAKER

(71) Applicant: Schneider Electric USA, Inc., Andover, MA (US)

(72) Inventors: Matthew Alan Williford, Nashville, TN (US); Amol Shrirang Bagaitkar, Mount Juliet, TN (US); Sergio Flores, Smyrna, TN (US)

(73) Assignee: Schneider Electric USA, Inc., Boston, MA (US)

( * ) Notice: Subject to any disclaimer, the term of this patent is extended or adjusted under 35 U.S.C. 154(b) by 205 days.

(21) Appl. No.: 17/557,241

(22) Filed: Dec. 21, 2021

(65) Prior Publication Data

US 2022/0209515 A1 Jun. 30, 2022

Related U.S. Application Data

(60) Provisional application No. 63/131,359, filed on Dec. 29, 2020.

(51) Int. Cl.
| | |
|---|---|
| H02B 11/133 | (2006.01) |
| H01H 71/12 | (2006.01) |
| H02B 1/056 | (2006.01) |

(52) U.S. Cl.
CPC ........... *H02B 11/133* (2013.01); *H02B 1/056* (2013.01); *H01H 71/123* (2013.01)

(58) Field of Classification Search
CPC .. H01H 3/00; H01H 3/02; H01H 3/22; H01H 3/30; H01H 3/32; H01H 9/20; H01H 9/22;

(Continued)

(56) References Cited

U.S. PATENT DOCUMENTS

| 5,434,369 A | 7/1995 | Tempco et al. |
|---|---|---|
| 8,304,672 B2 | 11/2012 | Lee et al. |

(Continued)

FOREIGN PATENT DOCUMENTS

JP 11285113 A 10/1999

OTHER PUBLICATIONS

Integrated Racking Mechanism, Addendum to 6055-30 (Masterclad 5-15 kV Indoor Switchgear), 6055-40 (Masterclad 27 kV Indoor Switchgear), and 6055-62 (Masterclad 5-15 kV Arc Resistant Switchgear), Instruction Bulletin, 6055-62B, Jun. 2017, Square D by Schneider Electric, 53 pages.

(Continued)

*Primary Examiner* — Anthony R Jimenez
(74) *Attorney, Agent, or Firm* — Locke Lord LLP

(57) ABSTRACT

A circuit breaker with an integrated motorized racking mechanism, automatically provides electrical power to the racking motor when the breaker is inserted into a breaker compartment. The racking motor remains powered when the breaker is in either a disconnected position, a testing position, or a fully connected position. A racking power plug mounted within the circuit breaker conducts electrical power to the racking motor by automatically connecting to a stationary racking power receptacle mounted in the breaker compartment, and remains connected as the circuit breaker moves through the breaker compartment during the racking operation. A control power plug is mounted in the circuit breaker to connect to a stationary control power receptacle mounted in the breaker compartment and to conduct control power to control circuits in the circuit breaker after the racking motor has completed racking the circuit breaker into the connected position in the breaker compartment.

20 Claims, 16 Drawing Sheets

(58) Field of Classification Search
CPC .... H01H 73/20; H01H 2207/022; H01H 1/00; H01H 1/12; H01H 1/22; H01H 1/36; H01H 1/365; H01H 1/38; H01H 1/42; H01H 1/46; H01H 71/08; H01H 71/12; H01H 71/123; H01H 11/00; H01H 11/01; H01H 13/00; H01H 13/10; H01H 13/11; H01H 13/15; H01H 13/40; H01H 13/516; H01H 13/518; H01H 13/71; H01H 13/713; H01H 9/00; H01H 9/03; H01H 9/05; H01H 9/0506; H01H 9/11; H01H 9/223; H01H 9/226; H02B 1/00; H02B 1/056; H02B 1/0565; H02B 1/20; H02B 1/20221; H02B 1/22; H02B 11/00; H02B 11/02; H02B 11/04; H02B 11/06; H02B 11/127; H02B 11/133; H01R 33/00; H01R 2201/00; H01R 2201/22; H01R 24/20; H01R 24/28; H01R 24/38; H01R 24/52; H01R 4/00; H01R 4/60

USPC .................................................... 200/50.21
See application file for complete search history.

(56) References Cited

U.S. PATENT DOCUMENTS

| | | | |
|---|---|---|---|
| 8,891,229 | B2 | 11/2014 | Fischer-Carne et al. |
| 2010/0025202 | A1 | 2/2010 | Mittu et al. |
| 2015/0180275 | A1* | 6/2015 | Tomassi .................. H02J 9/061 |
| | | | 307/64 |
| 2016/0301196 | A1 | 10/2016 | Hanna et al. |

OTHER PUBLICATIONS

Extended European Search Report dated May 12, 2022 for corresponding European Patent Application No. 21214864.7-1201, 10 pages.

* cited by examiner

FRONT VIEW

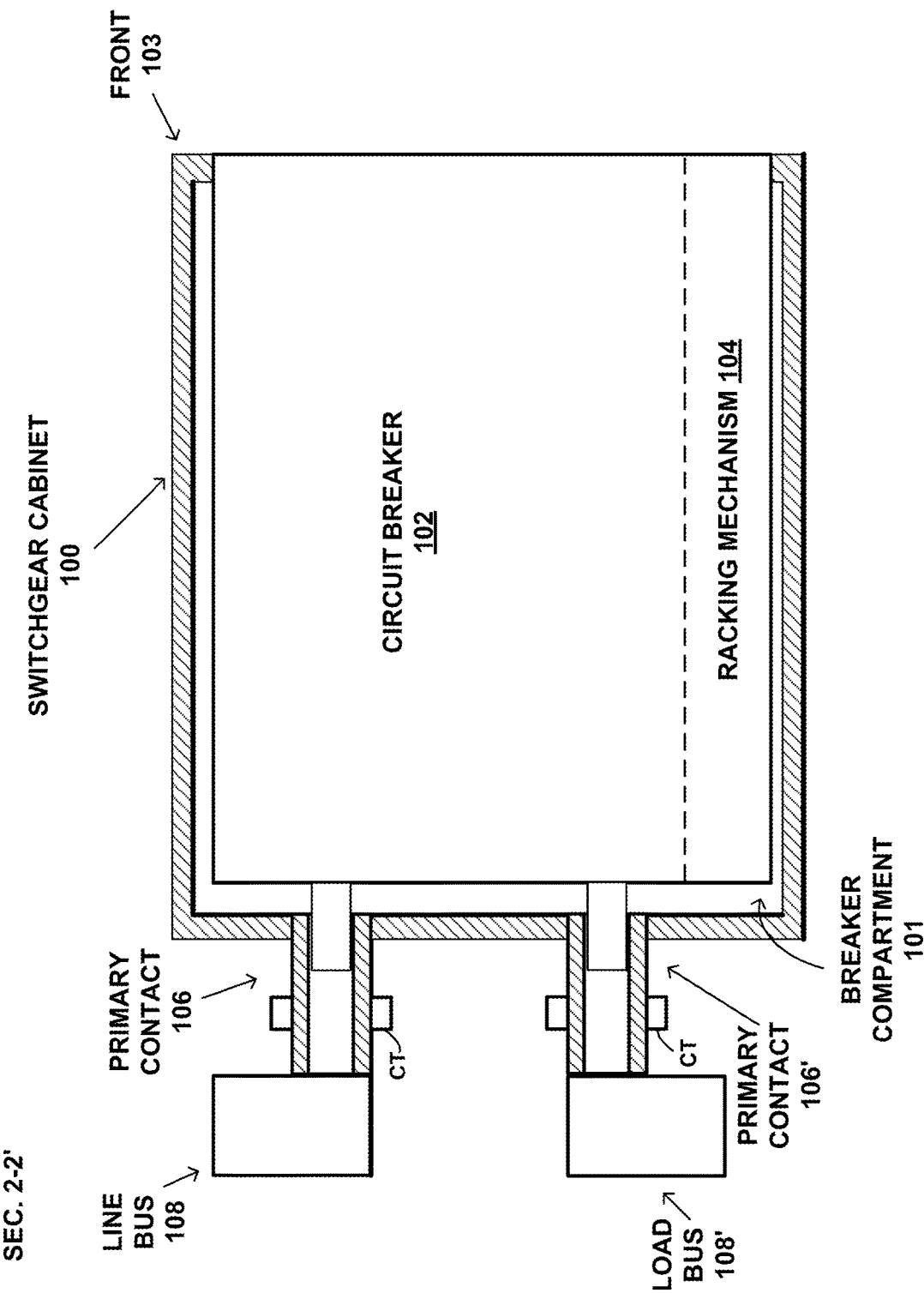

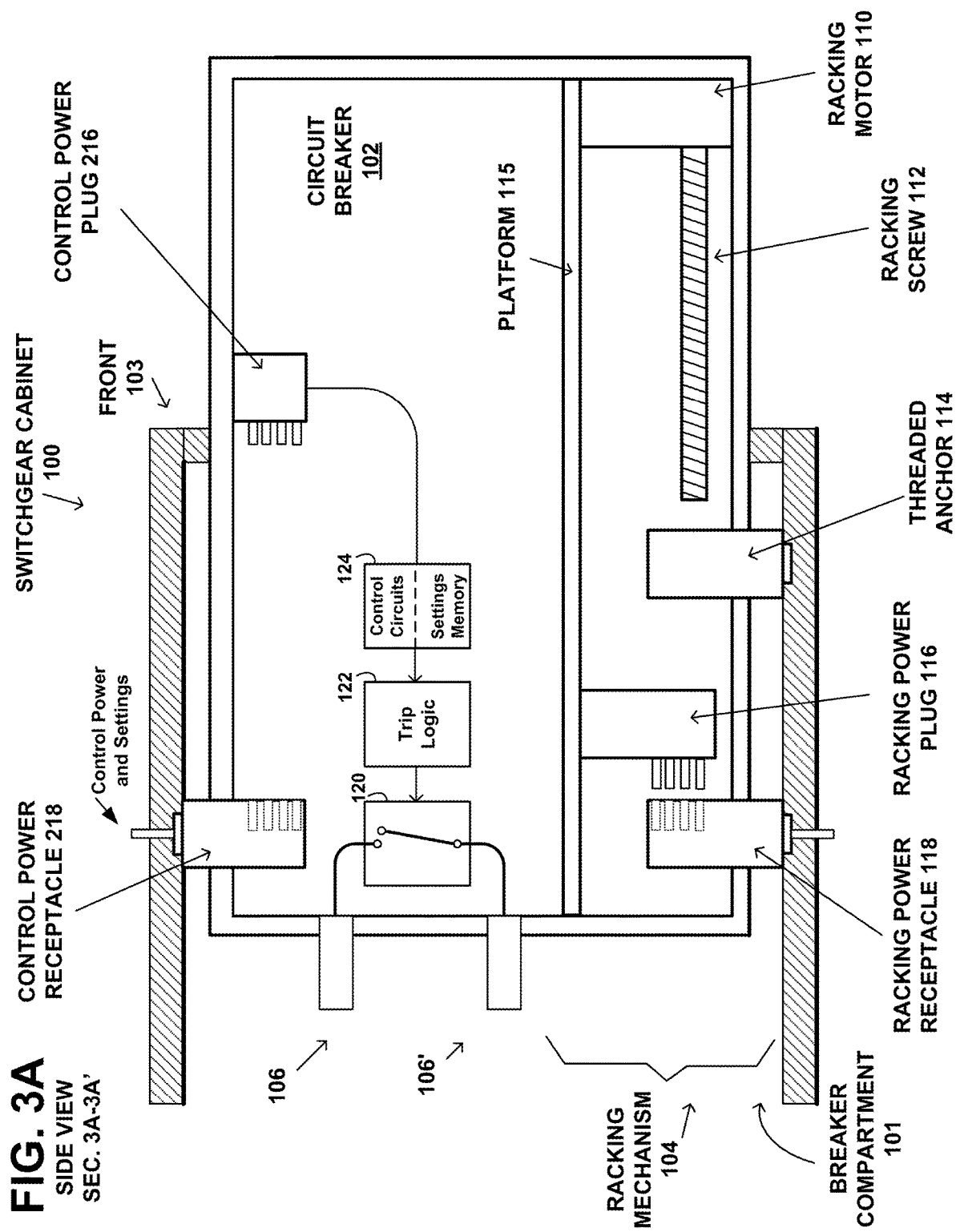

SIDE VIEW

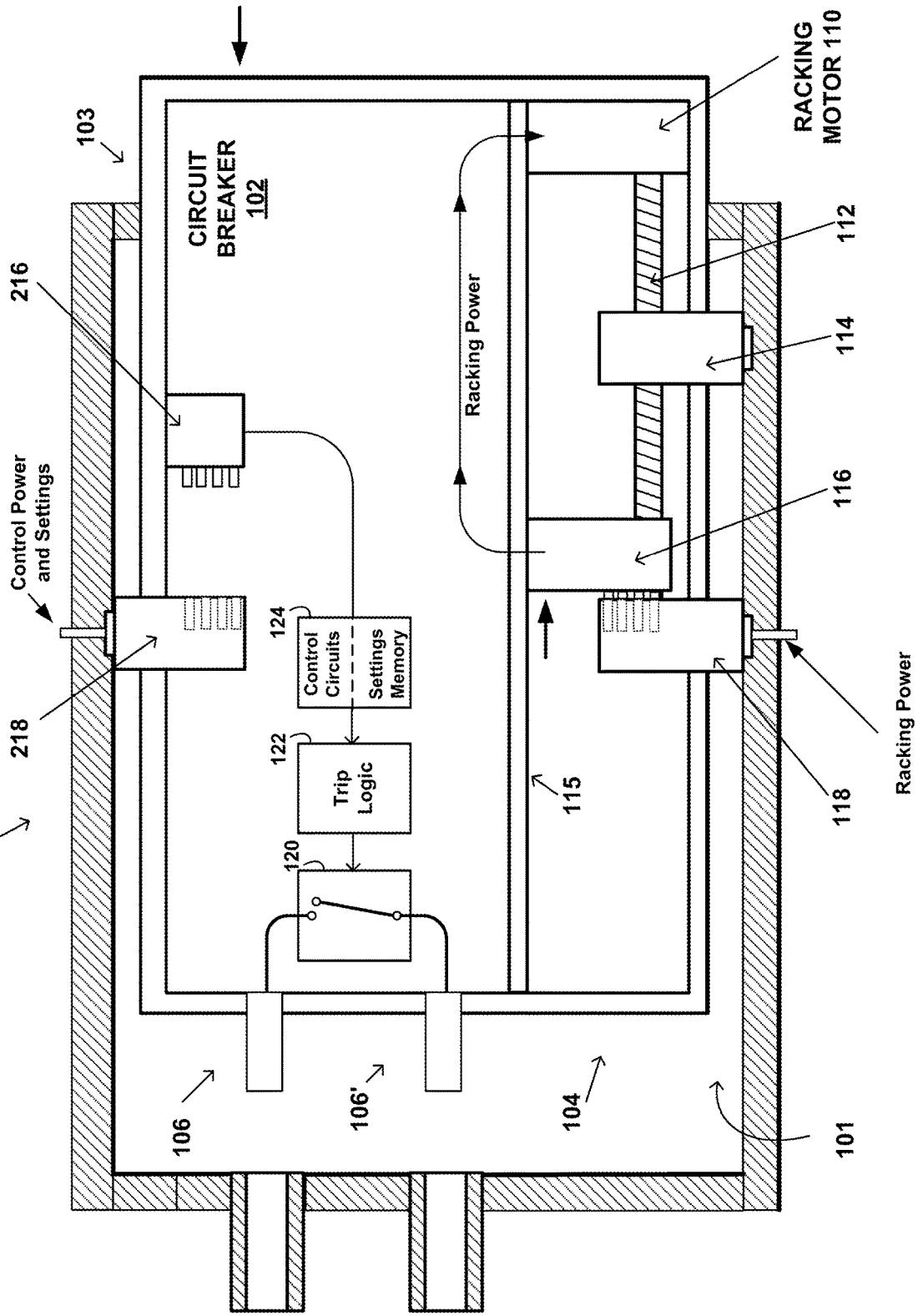

SIDE VIEW

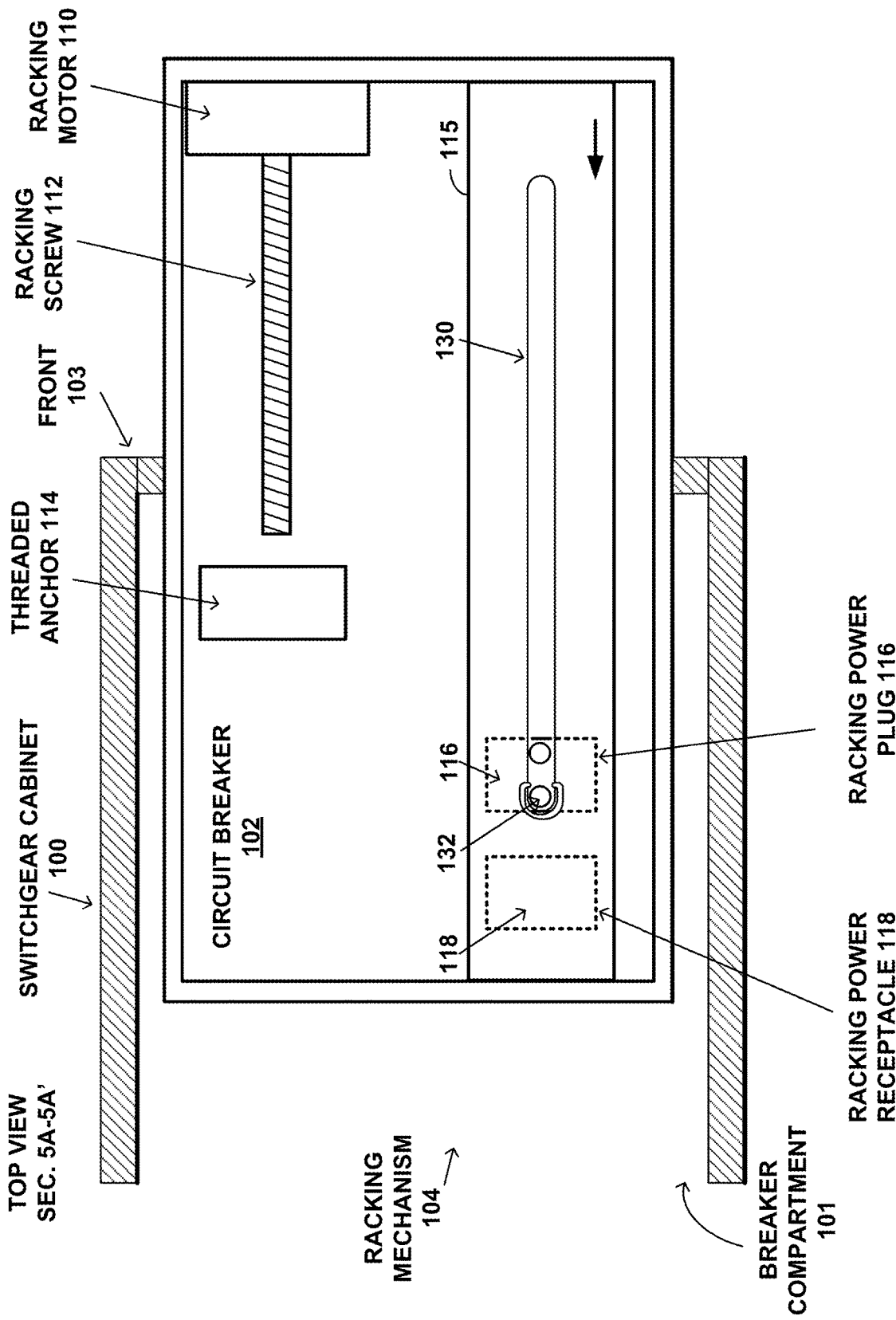

TOP VIEW

FRONT VIEW

SIDE VIEW
SEC. 7-7'

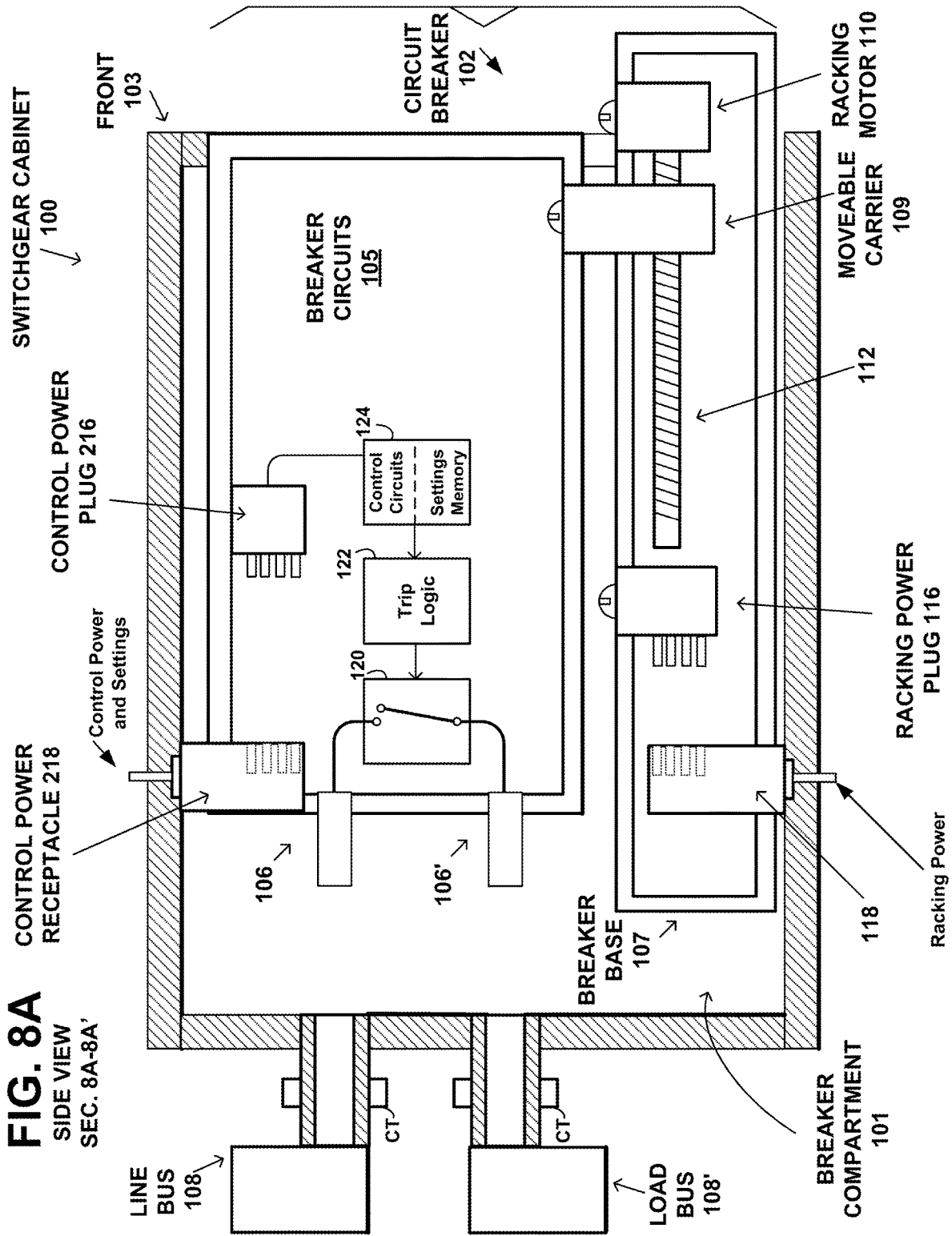

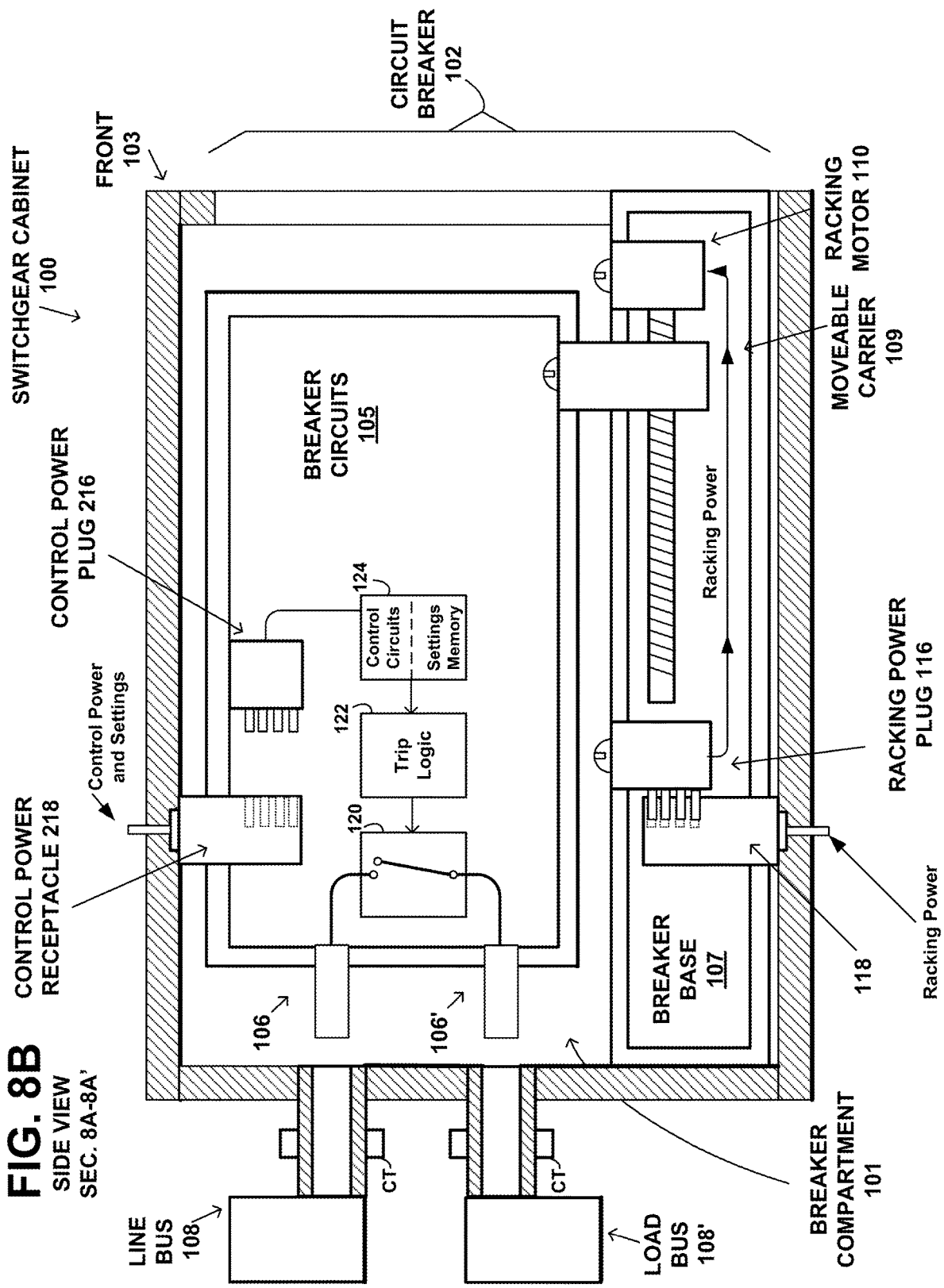

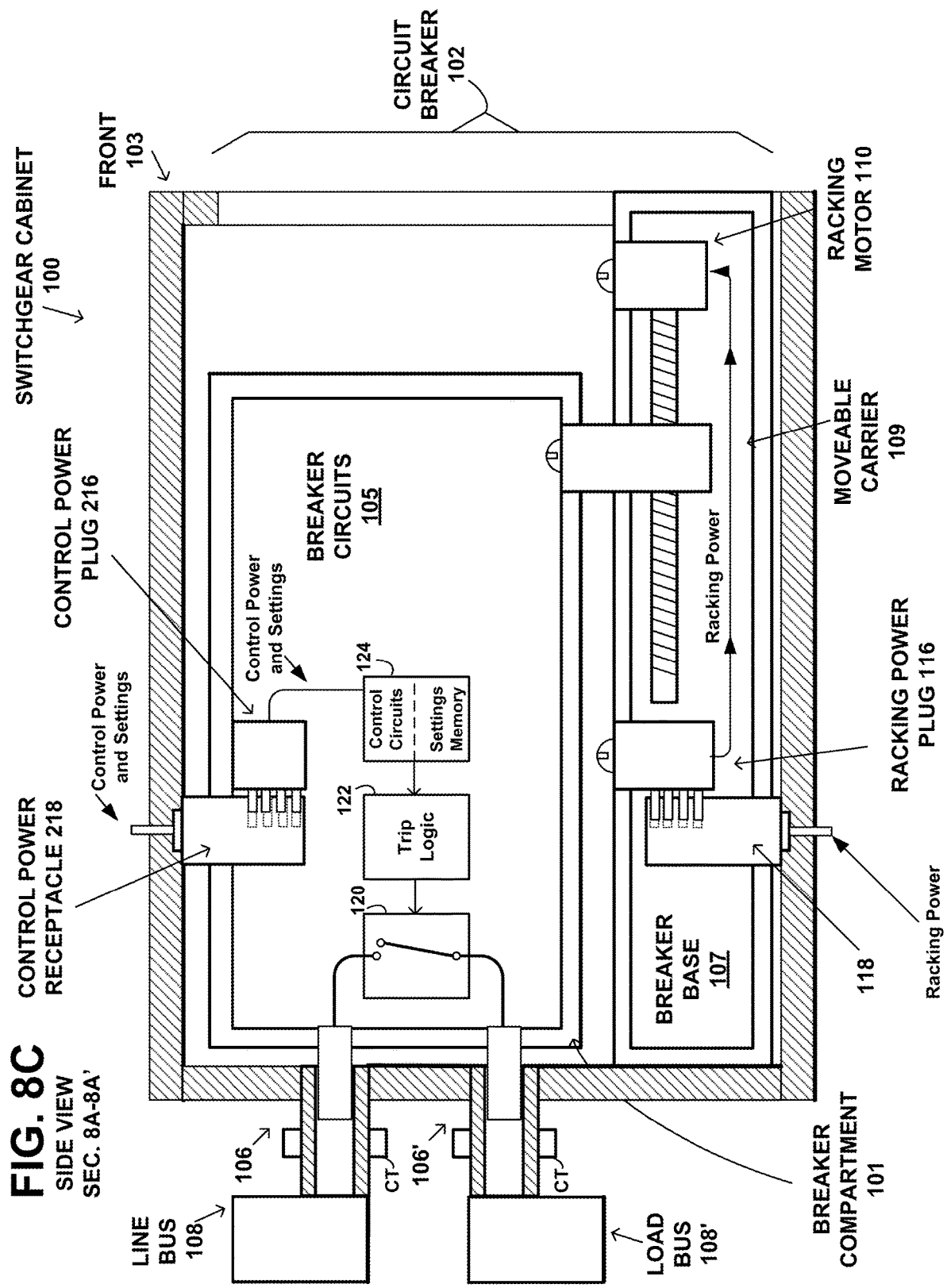

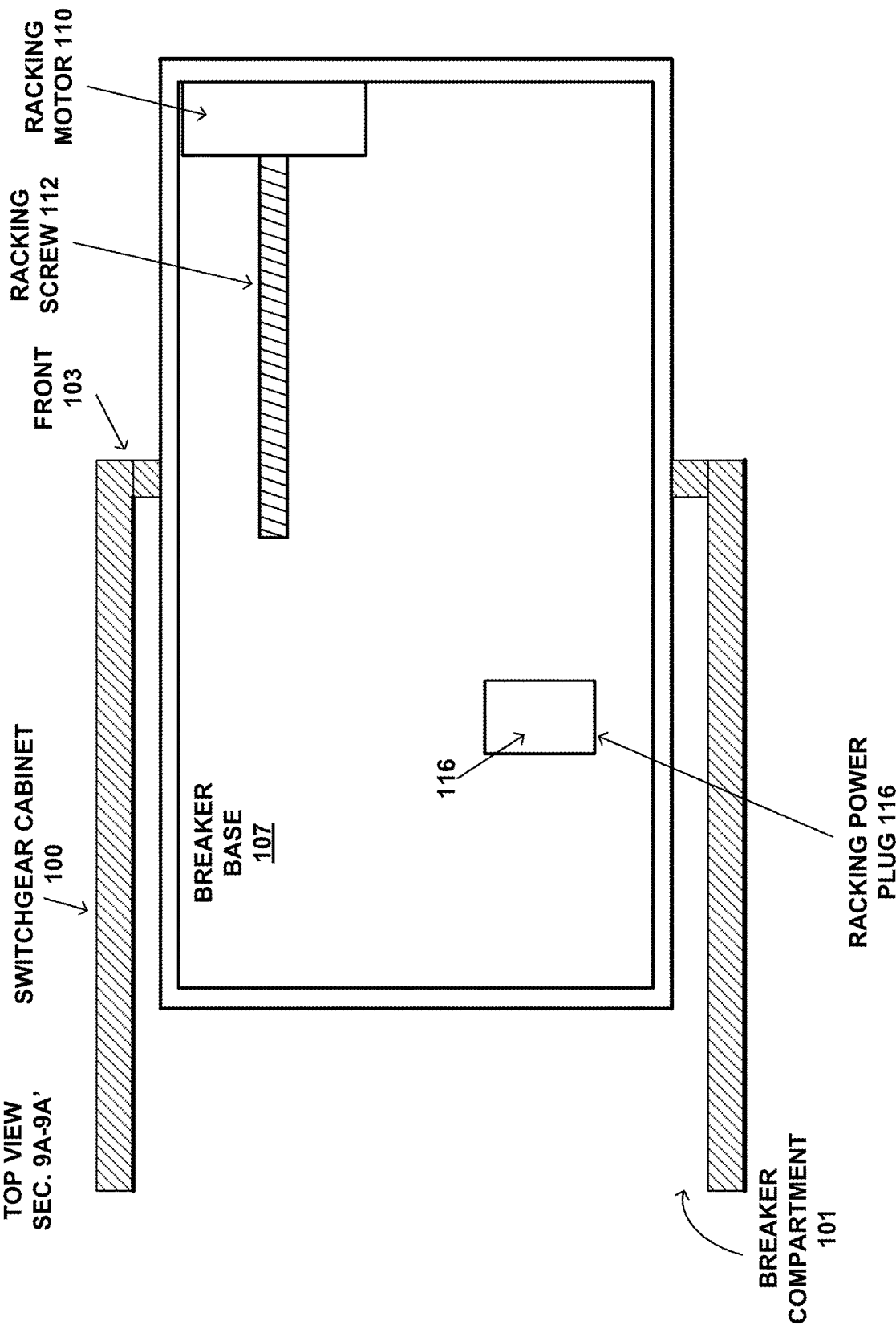

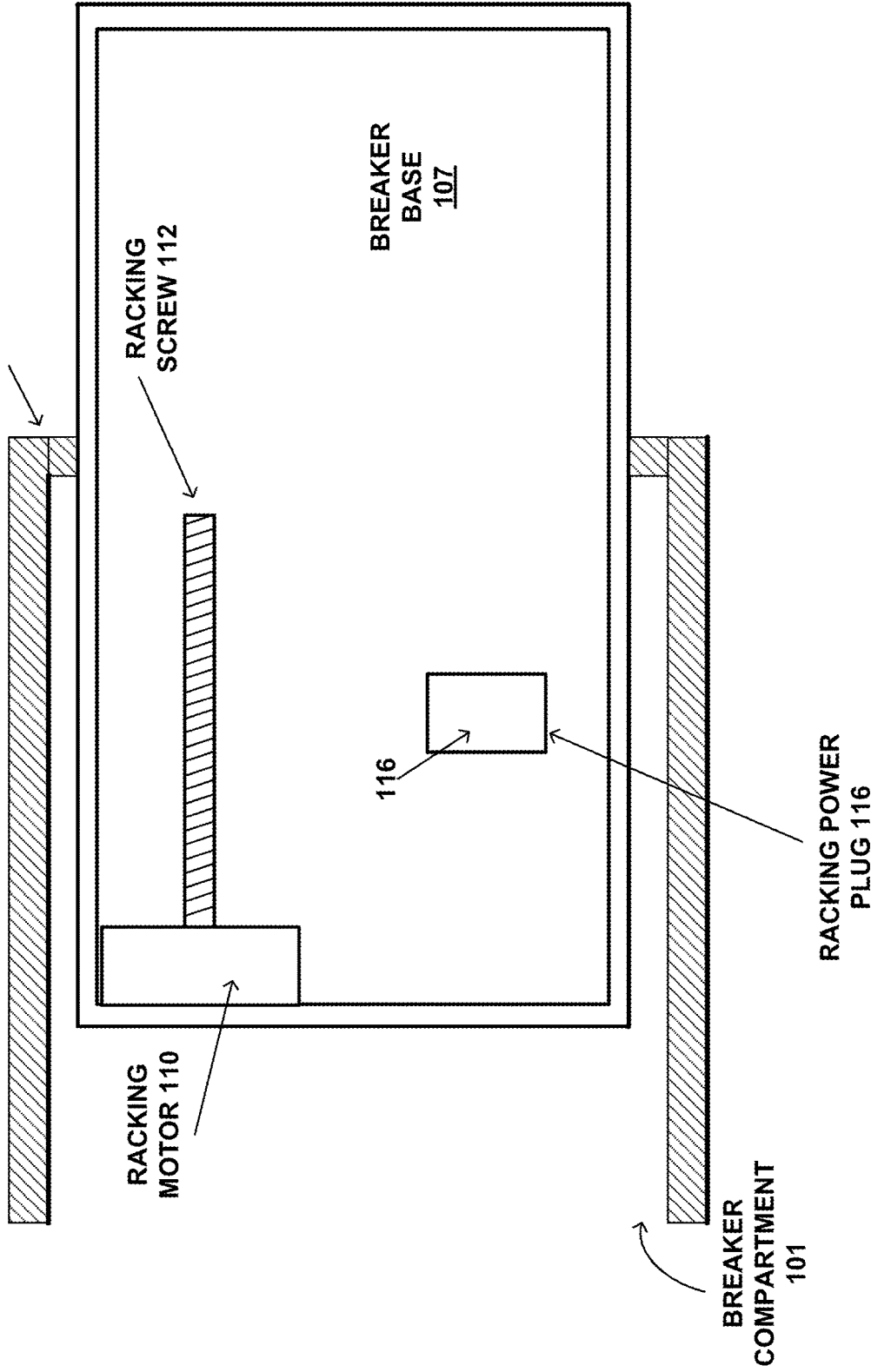

AUTOMATIC SECONDARY PLUG FOR INTEGRATED RACKING ON BREAKER

CROSS REFERENCE TO RELATED APPLICATIONS

This application claims the benefit of and priority to U.S. Provisional Application No. 63/131,359, filed on Dec. 29, 2020 under 35 U.S.C. 119(e), which application is incorporated by reference herein in its entirety.

TECHNICAL FIELD

The present disclosure relates to an integrated racking mechanism for a circuit breaker.

BACKGROUND

Industrial-sized circuit breakers typically do not have their own racking system, instead the racking system is part of the switchgear cabinet. When a circuit breaker is inserted, it engages the racking system in the cabinet and is then racked into the cabinet. The racking operation may be done either manually or electrically with a motorized racking system that is a part of the cabinet structure. By contrast, industrial-sized circuit breakers are available with a racking system that is an integral part of the breaker, so the motor is no longer stationary. However, connecting a motorized breaker to racking power becomes difficult, because the breaker can move in and out of the cabinet.

Some breakers are available with an umbilical cord power plug connected to the breaker, which must be manually connected to the source of control power and settings before the breaker is racked into the connected position. Making the manual connection within the cabinet is difficult, since the typical cabinet has interlocks that guarantee that the user has inserted the breaker before racking, and prevents taking the breaker out once it is in a connected position. Moreover, the manual process for connection to the source of control power and settings is not desirable since it creates an opportunity for making mistakes. An operator may forget to connect and disconnect the plug, and potentially limit an ability to prevent the operator from disconnecting the plug.

What is needed is a racking system that is an integral part of the breaker, with the racking arrangement that automatically provides racking power to the motor when the breaker is inserted into the cabinet, and the racking motor remains powered up when the breaker is in either a disconnected, test or connected positions with respect to the main bus in the switchgear cabinet, while a separate control power circuit can be disengaged in the disconnected position.

SUMMARY

In accordance with one example embodiment described herein, a circuit breaker with an integrated motorized racking mechanism, automatically provides electrical power to the racking motor when the breaker is inserted into the switching cabinet. The racking motor remains powered when the breaker is in either a disconnected position, a testing position, or a fully connected position with the main bus in the switchgear cabinet, without having to manually connect plugs to the source of control power and settings. A racking power plug is mounted within the circuit breaker and is configured to conduct electrical power to the racking motor. A racking power receptacle is mounted at a stationary position in the breaker compartment and is configured to automatically connect with the racking power plug when the circuit breaker is inserted into the breaker compartment. Electrical racking power is provided to the racking motor through the connected racking power plug, which remains connected to the racking power receptacle as the circuit breaker moves during the racking operation. The circuit breaker is configured to move relative to the racking power plug when the racking power plug is connected to the stationary racking power receptacle, while the circuit breaker moves within the breaker compartment during racking operation. The racking power plug remains connected to the racking power receptacle after reaching the connected position of the circuit breaker.

A control power plug is mounted in the circuit breaker and is configured to conduct control power to control circuits in the circuit breaker and to exchange control signals between the control circuits and testing or other equipment. The control power plug is configured to connect to a control power receptacle when the racking motor has racked the circuit breaker into the connected position and the racking operation is completed. The control power plug that is mounted in the circuit breaker moves relative to, and remains disconnected from, the control power receptacle that is mounted in the breaker compartment, while the circuit breaker moves within the breaker compartment during racking operation prior to reaching the connected position, at which point the control power plug becomes connected to the control power receptacle.

In accordance with one example embodiment described herein, a racking system for a circuit breaker comprises:
  a racking motor mounted in a circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
  a control power plug mounted in the circuit breaker, configured to conduct control power by connection to a control power receptacle mounted in the breaker compartment, when the racking motor has moved the circuit breaker into the connected position;
  a racking power plug mounted in the circuit breaker, configured to conduct the racking power to the racking motor; and
  a racking power receptacle mounted at a stationary position in the breaker compartment, configured to automatically connect with the racking power plug when the circuit breaker is inserted into the breaker compartment, to provide the racking power to the racking motor through the connected racking power plug;
  wherein the racking power plug remains connected to the racking power receptacle at its stationary position in the breaker compartment while the circuit breaker moves within the breaker compartment during the racking operation and after the circuit breaker reaches the connected position.

In accordance with one example embodiment described herein, the racking system for a circuit breaker further comprises:
  wherein circuit breaker moves relative to the racking power plug when the racking power plug is connected to the stationary racking power receptacle while the circuit breaker moves within the breaker compartment during racking operation, and the racking power plug remains connected to the racking power receptacle after reaching the connected position.

In accordance with one example embodiment described herein, the racking system for a circuit breaker further comprises:
  wherein the control power plug mounted in the circuit breaker moves relative to and remains disconnected from the control power receptacle mounted in the breaker compartment while the circuit breaker moves within the breaker compartment during racking operation prior to reaching the connected position where the control power plug becomes connected to the control power receptacle.

In accordance with one example embodiment described herein, the racking system for a circuit breaker further comprises:
  wherein the racking motor is configured to drive a racking linkage for racking the circuit breaker into the breaker compartment when provided with racking power via the racking power plug and the racking power receptacle.

In accordance with one example embodiment described herein, the racking system for a circuit breaker further comprises:
  wherein the racking power plug is configured to connect to the racking power receptacle when the circuit breaker enters the breaker compartment.

In accordance with one example embodiment described herein, the racking system for a circuit breaker further comprises:
  wherein the control power plug is accessible from outside the breaker compartment when the circuit breaker is drawn out from the breaker compartment.

In accordance with one example embodiment described herein, the racking system for a circuit breaker further comprises:
  wherein the connection of the primary contacts of the circuit breaker to the main bus is with primary stabs in the circuit breaker when the racking motor has moved the circuit breaker into the connected position.

In accordance with one example embodiment described herein, a circuit breaker comprises:
  a racking motor mounted in the circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
  a control power plug mounted in the circuit breaker, configured to conduct control power by connection to a control power receptacle mounted at a stationary position in the breaker compartment, when the racking motor has moved the circuit breaker into the connected position;
  a racking power plug mounted in the circuit breaker, configured to conduct the racking power to the racking motor by connection to a racking power receptacle mounted at a stationary position in the breaker compartment;
  wherein the racking power plug remains connected to the racking power receptacle at its stationary position in the breaker compartment while the circuit breaker moves within the breaker compartment during the racking operation and after the circuit breaker reaches the connected position.

In accordance with one example embodiment described herein, the circuit breaker further comprises:
  wherein circuit breaker moves relative to the racking power plug when the racking power plug is connected to the stationary racking power receptacle while the circuit breaker moves within the breaker compartment during racking operation, and the racking power plug remains connected to the racking power receptacle after reaching the connected position.

In accordance with one example embodiment described herein, the circuit breaker further comprises:
  wherein the control power plug mounted in the circuit breaker moves relative to and remains disconnected from the control power receptacle mounted in the breaker compartment while the circuit breaker moves within the breaker compartment during racking operation prior to reaching the connected position where the control power plug becomes connected to the control power receptacle.

In accordance with one example embodiment described herein, the circuit breaker further comprises:
  wherein the racking motor is configured to drive a racking linkage for racking the circuit breaker into the breaker compartment when provided with racking power via the racking power plug and the racking power receptacle.

In accordance with one example embodiment described herein, the circuit breaker further comprises:
  wherein the racking power plug is configured to connect to the racking power receptacle when the circuit breaker enters the switchgear cabinet.

In accordance with one example embodiment described herein, the circuit breaker further comprises:
  wherein the connection of the primary contacts of the circuit breaker to the main bus is with primary stabs in the circuit breaker when the racking motor has moved the circuit breaker into the connected position.

In accordance with one example embodiment described herein, a racking system for a circuit breaker comprises:
  a racking motor mounted in a circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
  a first control power connector mounted in the circuit breaker, configured to conduct control power by connection to a second control power connector mounted at a stationary position in the breaker compartment, when the racking motor has moved the circuit breaker into the connected position;
  a first racking power connector mounted in the circuit breaker, configured to conduct the racking power to the racking motor; and
  a second racking power connector mounted at a stationary position in the breaker compartment, configured to automatically connect with the first racking power connector when the circuit breaker is inserted into the breaker compartment, to provide the racking power to the racking motor through the connected first racking power connector;
  wherein the first racking power connector remains connected to the second racking power connector at its stationary position in the breaker compartment while the circuit breaker moves within the breaker compartment during the racking operation and after the circuit breaker reaches the connected position.

In accordance with one example embodiment described herein, the racking system for a circuit breaker further comprises:

wherein circuit breaker moves relative to the first racking power connector when the first racking power connector is connected to the second racking power connector mounted at its stationary position in the breaker compartment.

In accordance with one example embodiment described herein, the racking system for a circuit breaker further comprises:

wherein the first control power connector mounted in the circuit breaker moves relative to the second control power connector while the circuit breaker moves within the breaker compartment during racking operation prior to reaching the connected position.

In accordance with one example embodiment described herein, the racking system for a circuit breaker further comprises:

wherein the racking motor is configured to drive a racking linkage for racking the circuit breaker into the breaker compartment when provided with racking power via the first racking power connector and the second racking power connector.

In accordance with one example embodiment described herein, the racking system for a circuit breaker further comprises:

wherein the first racking power connector is configured to connect to the second racking power connector when the circuit breaker enters the breaker compartment.

In accordance with one example embodiment described herein, the racking system for a circuit breaker further comprises:

wherein the first control power connector is accessible from outside the breaker compartment when the circuit breaker is drawn out from the breaker compartment.

In accordance with one example embodiment described herein, the racking system for a circuit breaker further comprises:

wherein the connection of the primary contacts of the circuit breaker to the main bus is with primary stabs in the circuit breaker when the racking motor has moved the circuit breaker into the connected position.

The resulting apparatus and system provide a motorized breaker arrangement that powers-up the motor when the breaker is inserted into the cabinet and remains powered up when the breaker is in either a disconnected position, a test position, or a connected position.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 2 is a side view along the section line 2-2' of FIG. 1, illustrating the example breaker compartment of the switchgear cabinet, circuit breaker, primary contacts to the main bus, and racking mechanism that is an integral part of the circuit breaker.

FIG. 3A is a side view along the section line 3A-3A' of FIG. 1, of the example circuit breaker, showing the example racking mechanism inside of the circuit breaker, with the initial position of the example racking power plug shown when the circuit breaker is initially inserted by a technician into the breaker compartment, before connecting to the example racking power receptacle. The control power plug that is mounted in the circuit breaker, remains disconnected from the stationary control power receptacle that is mounted in the breaker compartment, while the circuit breaker moves within the breaker compartment during racking operation prior to reaching the connected position of FIG. 3D, at which point the control power plug becomes connected to the stationary control power receptacle.

FIG. 3C is a side interior view of the example circuit breaker of FIG. 3B, showing the racking power plug having remained plugged into the stationary racking power receptacle to continue powering the racking motor while the circuit breaker is moved in the racking operation by the racking motor. The control power plug is shown remaining disconnected from the stationary control power receptacle.

FIG. 5A is a top cross sectional view along the section line 5-5A of FIG. 1, showing the first example embodiment of the racking mechanism in the circuit breaker when it is inserted into the switchgear cabinet, with the initial positions of the racking power plug and the racking power receptacle corresponding to FIGS. 3A and 4A.

FIG. 8A is a side view along the section line 8A-8A' of the alternate embodiment of FIG. 6, of the example circuit breaker comprising breaker circuits and breaker base, inside of the circuit breaker, with the initial position of the example racking power plug shown when the circuit breaker is initially inserted by a technician into the breaker compartment, before connecting to the example racking power receptacle. The control power plug that is mounted in the circuit breaker, remains disconnected from the stationary control power receptacle that is mounted in the breaker compartment, while the circuit breaker moves within the breaker compartment during racking operation prior to reaching the connected position of FIG. 8C, at which point the control power plug becomes connected to the stationary control power receptacle.

FIG. 8B is a side interior view of the example circuit breaker of the alternate embodiment of FIG. 8A, showing the position of the circuit breaker when the technician has adjusted the position of the breaker, enabling the racking power plug to automatically connect to the stationary racking power receptacle, where it can begin to apply racking power to the racking motor. The racking power plug remains stationary with respect to the breaker compartment as the circuit breaker moves with respect to the compartment, since the racking power plug is now connected to the stationary racking power receptacle. The adjusted position of the breaker also mates the racking screw with the moveable carrier, which begins advancing the breaker in the motorized racking operation. The control power plug mounted in the moving circuit breaker, is shown remaining disconnected from the stationary control power receptacle.

FIG. 8C is a side interior view of the example circuit breaker of the alternate embodiment of FIG. 8B in the connected position, showing the racking power plug continuing to be plugged into the racking power receptacle to continue powering the racking motor as the circuit breaker becomes fully racked with its primary contacts connecting with the main bus. The control power plug is shown connected to the stationary control power receptacle upon reaching the connected position.

FIG. 9A is a top cross sectional view along the section line 9-9A of the alternate embodiment of FIG. 6, showing the first example embodiment of the breaker base in the circuit breaker when it is inserted into the switchgear cabinet, with the position of the racking motor close to the front end of the breaker base to thereby push the breaker circuits toward the connected position of the circuit breaker, corresponding to FIG. 8A.

FIG. 9B is a top cross sectional view along the section line 9-9A of the alternate embodiment of FIG. 6, showing a second example embodiment of the breaker base in the circuit breaker, with the racking motor positioned close to the back end of the breaker base, to thereby pull the breaker circuits toward the connected position of the circuit breaker, corresponding to FIG. 8A.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
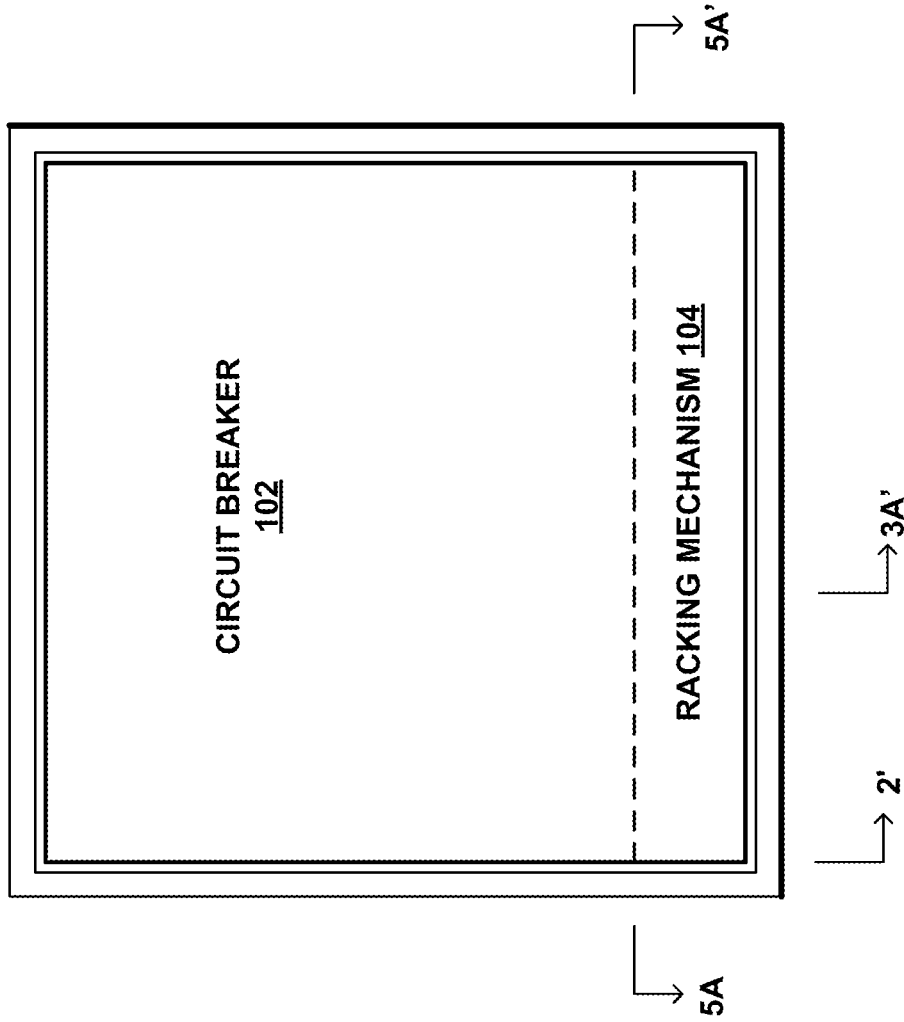
FIG. 1 illustrates a front, overall view of the example switchgear cabinet, example circuit breaker, and example racking mechanism that is an integral part of the circuit breaker.

FIG. 1 illustrates a front, overall view of the example switchgear cabinet 100, example circuit breaker 102, and example racking mechanism 104 that is an integral part of the circuit breaker 102.

FIG. 2 is a side view along the section line 2-2' of FIG. 1, illustrating the example breaker compartment 101 of the switchgear cabinet 100, the circuit breaker 102, line side primary contact 106, breaker power connector, primary electrical plug or stabs, to the main line bus 108 or connector of the switchgear cabinet, the load side primary contact 106' to the main load bus 108', and the racking mechanism 104 that is an integral part of the circuit breaker 102.

FIG. 3A is a side view along the section line 3A-3A' of FIG. 1, of the example circuit breaker 102, showing the example racking mechanism 104 inside of the circuit breaker 102. The circuit breaker 102 is shown as having been initially positioned by a technician at the front entrance 103 to the breaker compartment 101. The circuit breaker 102 includes a main contacts switch 120 connected between the line side primary contact 106 and the load side primary contact 106'. After the circuit breaker 102 has been racked into the switchgear cabinet 100, the main contacts switch 120 is configured to interrupt current flowing from the line side primary contact 106 to the load side primary contact 106' in response to a trip signal from the trip logic 122 resulting from a fault signal from the current transformers CT, based on the settings stored in the settings memory 124.

The example racking mechanism 104 includes a racking motor 110 that is configured to drive a mechanical linkage when receiving racking power, to move the circuit breaker 102 in the racking operation. An example mechanical linkage may be the racking screw 112 that is driven into rotation by the racking motor 110 to engage and advance through the threaded anchor 114 that is fastened to the bottom of the breaker compartment 101. In a racking operation to move the circuit breaker 102 to connect with the line bus and load bus, the racking screw pulls the racking motor 110, and thus the circuit breaker 102, into the breaker compartment 101. In a rack-out operation to disconnect the circuit breaker 102 from the line bus and load bus, the racking screw pushes the racking motor 110, and thus the circuit breaker 102, out of the breaker compartment 101.

The example racking power plug 116 or first racking power connector is moveably mounted on a platform 115 that is fastened on the bottom side of the circuit breaker 102. The racking power plug is configured to conduct racking power and control signals to the racking motor 110.

The example racking power receptacle 118 or second racking power connector is mounted at a stationary position on the interior bottom surface of the breaker compartment 101. The racking power receptacle 118 is configured to automatically connect with the racking power plug 116 when the circuit breaker 102 is advanced by the technician into the breaker compartment 101, to provide the racking power to the racking motor 110 through the connected racking power plug 116. In a second example embodiment of the racking mechanism 104 shown in FIG. 5B, the auxiliary power receptacle 118 and the threaded anchor 114 are positioned closer to the front 103 of the switchgear cabinet 100, to enable automatically connecting the racking power plug 116 to the racking power receptacle 118 as soon as the circuit breaker 102 is inserted into the breaker compartment 101 of the switchgear cabinet 100. In an alternate example embodiment, the connector types of the first racking power connector 116 and the second racking power connector 118 may be reversed, so that the connector 116 is a receptacle-type connector and the connector 118 is a plug-type connector. Other types of mating electrical connectors may also be used in alternate embodiments for connectors 116 and 118, such as a finger cluster connector mated with a stab connector.

The example control power plug 216 or first control power connector is shown mounted in the circuit breaker 102 in FIG. 3A. The control power plug 216 remains disconnected from the example control power receptacle 218 or second control power connector that is mounted in the breaker compartment 101 of the switchgear cabinet 100, while the circuit breaker moves within the breaker compartment during the racking operation. When the control power plug 216 reaches the connected position of FIG. 3D, the control power plug 216 becomes connected to the control power receptacle 218. The circuit breaker is shown in the disconnected position in FIG. 3A, where the control power plug 216 is accessible to externally located equipment to conduct control power to control circuits 124 in the circuit breaker and to exchange control signals between the control circuits 124 and testing or other external equipment. In an alternate example embodiment, the connector types of the first control power connector 216 and the second control power connector 218 may be reversed, so that the connector 216 is a receptacle-type connector and the connector 218 is a plug-type connector. Other types of mating electrical connectors may also be used in alternate embodiments for connectors 216 and 218, such as a finger cluster connector mated with a stab connector.

Figure 3B:
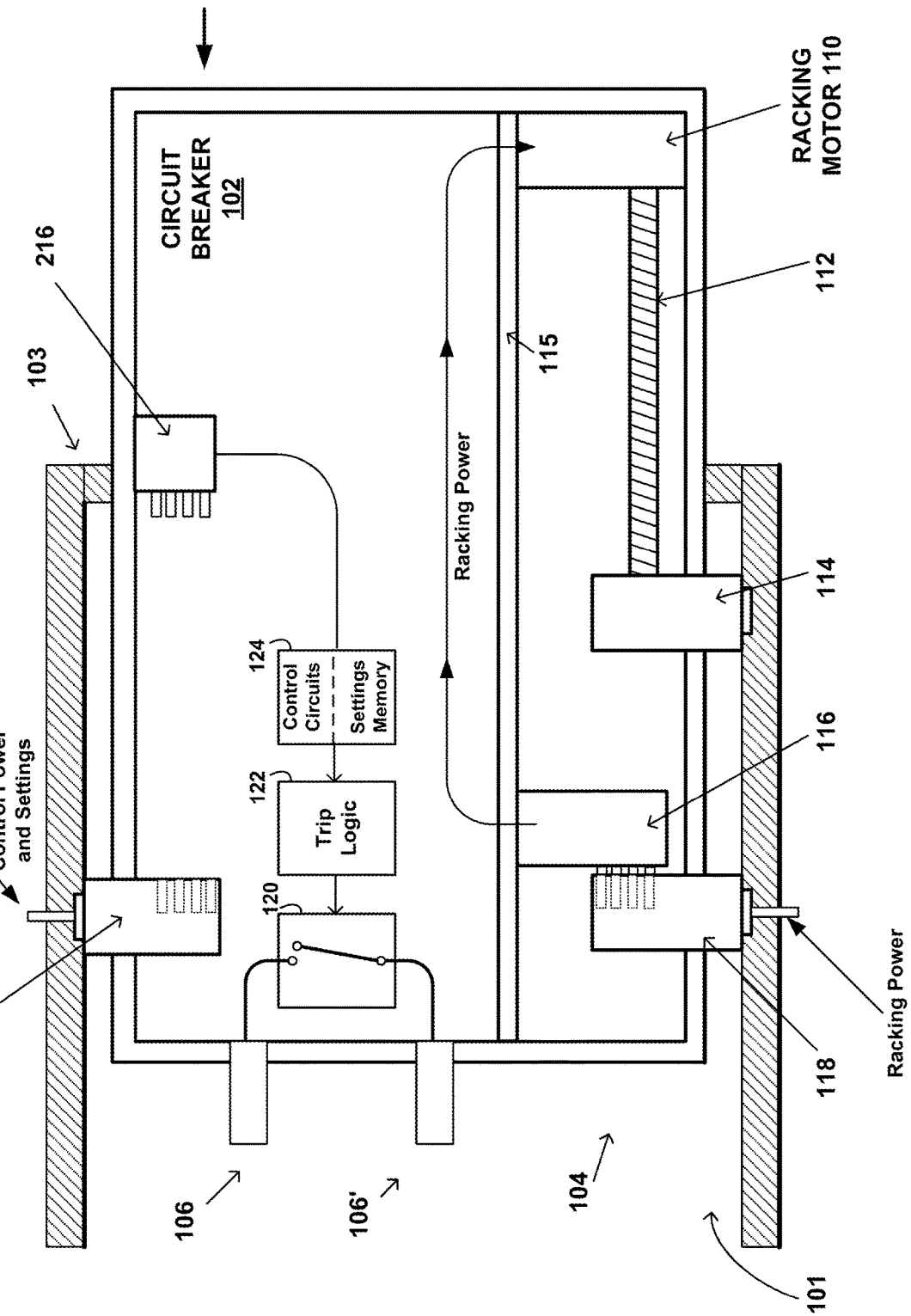
FIG. 3B is a side interior view of the example circuit breaker of FIG. 3A, showing the position of the circuit breaker when the technician has adjusted the position of the breaker, enabling the racking power plug to automatically connect to the stationary racking power receptacle, where it can begin to apply racking power to the racking motor. The racking power plug remains stationary with respect to the breaker compartment as the circuit breaker moves with respect to the compartment, since the racking power plug is now connected to the stationary racking power receptacle. The adjusted position of the breaker also mates the racking screw with the threaded anchor, which begins advancing the breaker in the motorized racking operation. The control power plug mounted in the moving circuit breaker, is shown remaining disconnected from the stationary control power receptacle.

The example circuit breaker 102 is initially positioned by the technician as shown in FIG. 3A, just prior to the racking power plug 116 connecting to the auxiliary power receptacle 118. As the technician advances the position of the circuit breaker 102 into the breaker compartment 101, the racking power plug 116 becomes connected to the auxiliary power receptacle 118 as shown in FIG. 3B, and racking power is made available to the racking motor 110. The adjusted position of the breaker by the technician also mates the racking screw 112 with the threaded anchor 114, which begins advancing the breaker 102 in the motorized racking operation. The racking motor 110 begins to advance through the threaded anchor 114, pulling the circuit breaker 102 further into the breaker compartment.

Figure 4A:
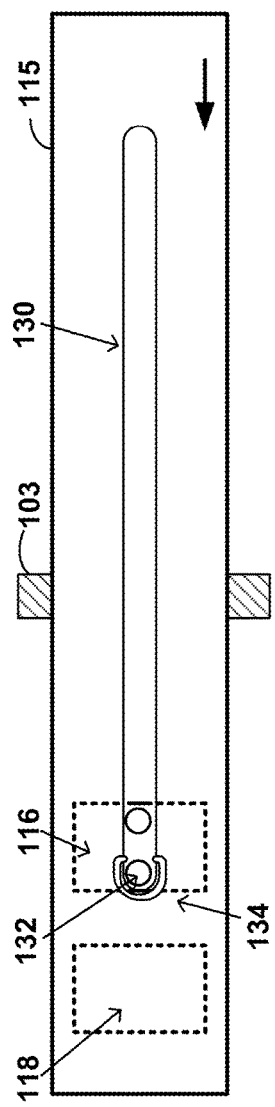
FIG. 4A is a top view of the example platform in the circuit breaker, showing the example initial positions of the racking power plug and the racking power receptacle corresponding to FIG. 3A.

FIG. 4A is a top view of the example platform 115 in the circuit breaker 102, showing the example relative positions of the racking power plug 116 and the racking power receptacle 118 corresponding to FIG. 3A. The circuit breaker 102 is shown as having been initially positioned at the entrance 103 to the breaker compartment 101. The slot 130 in the platform 115 guides the racking power plug 116 as it moves with respect to the platform 115 while the circuit breaker is racked into the breaker compartment. The figure shows the example retention spring 134 mounted on top of the platform 115 at the end of the slot 130 nearest the racking power receptacle 118, as shown in FIG. 3A. The retention spring 134 temporarily captures the stud 132 mounted on the top of the racking power plug 116, which projects upward through the slot 130, to enable the racking power plug 116 to travel along with the platform 115 as the circuit breaker is inserted into the breaker compartment. When the racking power plug 116 comes into contact with the racking power receptacle 118, the contact pins of the racking power plug 116 are forced into the corresponding sockets of the racking power receptacle 118 as the racking power plug 116 continues to approach the racking power receptacle 118, as shown in FIGS. 3A and 3B.

Figure 5B:
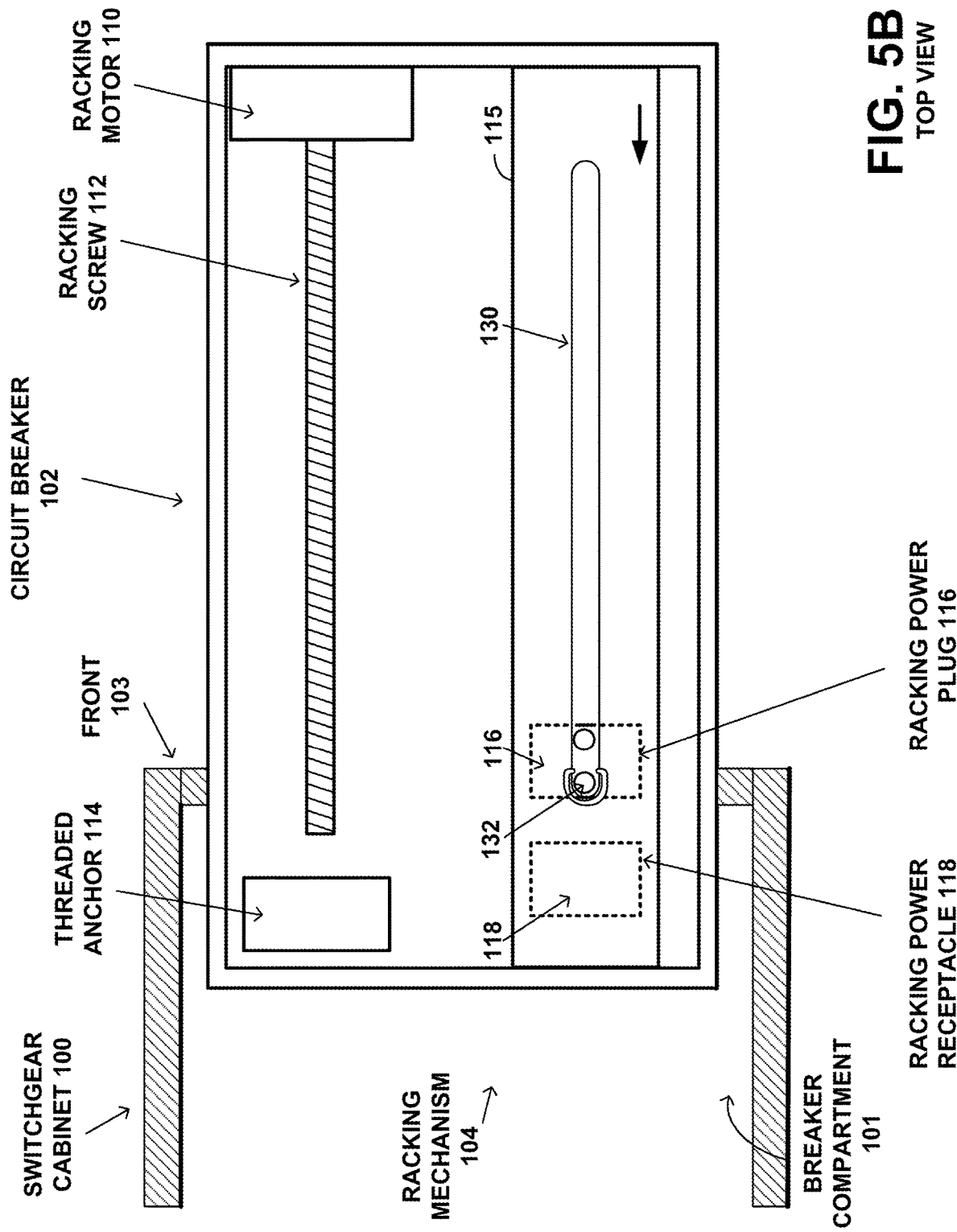
FIG. 5B is a top cross sectional view along the section line 5-5A of FIG. 1, showing a second example embodiment of the racking mechanism in the circuit breaker, with the racking power receptacle positioned close to the front of the switchgear cabinet, to enable automatically connecting the racking power plug to the racking power receptacle as soon as the circuit breaker is inserted into the breaker compartment of the switchgear cabinet.

FIG. 5A is a top cross sectional view along the section line 5-5A of FIG. 1, showing the first example embodiment of the racking mechanism 104 in the circuit breaker 102 when it is inserted into the switchgear cabinet 100. The initial positions of the racking power plug 116 and the racking power receptacle 118 correspond to that shown in FIGS. 3A and 4A. In a second example embodiment of the racking mechanism 104 shown in FIG. 5B, the auxiliary power receptacle 118 and the threaded anchor 114 are positioned closer to the front 103 of the switchgear cabinet 100, to enable connecting the racking power plug 116 to the racking power receptacle 118 as soon as the circuit breaker 102 is inserted into the breaker compartment 101 of the switchgear cabinet 100.

FIG. 3B is a side interior view of the example circuit breaker of FIG. 3A, showing the racking power plug 116 connected with its contact pins inserted into the corresponding sockets of to the auxiliary power receptacle 118. The figure shows the position of the circuit breaker 102 when the technician has adjusted the position of the breaker to enable the racking power plug 116 to automatically connect to the racking power receptacle 118, where it can begin to apply racking power to the racking motor 110. The racking power plug 116 remains stationary with respect to the breaker compartment 101 as the circuit breaker 102 moves with respect to the breaker compartment 101, since the racking power plug 116 is now connected to the stationary racking power receptacle 118. The position of the breaker 102, as adjusted by the technician, also mates the racking screw 112 with the threaded anchor 114, which begins advancing the breaker 102 in the motorized racking operation. The control power plug 216 remains disconnected from the control power receptacle 218 mounted in the breaker compartment 101 of the switchgear cabinet 100, while the circuit breaker moves within the breaker compartment during the racking operation.

Figure 4B:
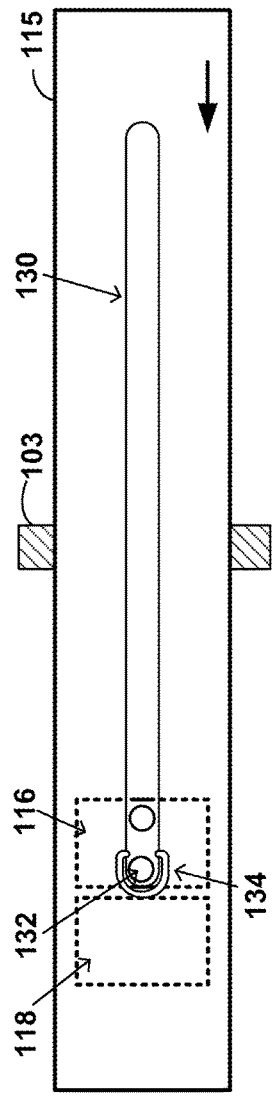
FIG. 4B is a top view of the platform in the circuit breaker, showing the example relative positions of the racking power plug and the racking power receptacle corresponding to FIG. 3B, as electrical contact is made between the two plugs and racking power is provided to the racking motor.

FIG. 4B is a top view of the platform in the circuit breaker, showing the example relative positions of the racking power plug and the racking power receptacle corresponding to FIG. 3A, as electrical contact is made between the two plugs 116 and 118 and racking power is provided to the racking motor 110. As the circuit breaker and platform 115 are moved by the racking motor 110 with respect to the racking power receptacle 118, the stud 132 on top of the racking power plug 116 is released from the retention spring 134, the racking power plug 116 being effectively pushed by the racking power receptacle 118 as the racking operation progresses.

FIG. 3C is a side interior view of the example circuit breaker of FIG. 3B, showing the racking power plug 116 having remained plugged into the stationary racking power receptacle 118, so as to continue powering the racking motor 110 while the circuit breaker 102 is moved in the racking operation by the racking motor 110. The racking power plug 116 is moveably mounted on the platform 115 and is guided by the slot 130 in the platform 115 to move with respect to the platform 115 and the circuit breaker's structure, remaining in position in electrical contact with the racking power receptacle 118. The control power plug 216 remains disconnected from the control power receptacle 218 that is mounted in the breaker compartment 101 of the switchgear cabinet 100, while the circuit breaker moves within the breaker compartment during the racking operation.

Figure 4C:
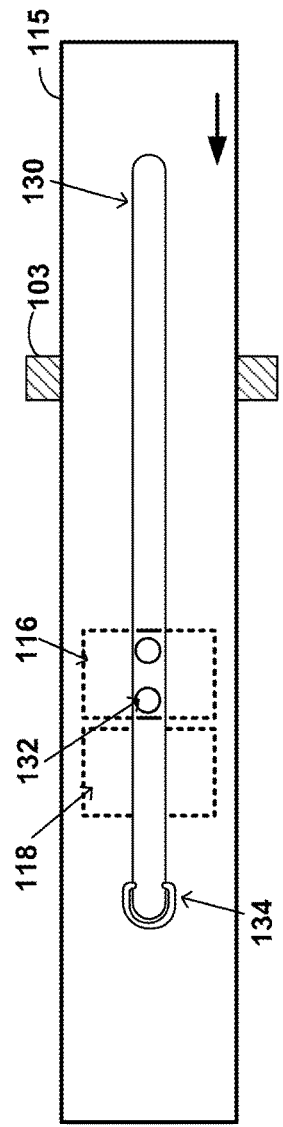
FIG. 4C is a top view of the platform in the circuit breaker, showing the example relative positions of the racking power plug and the racking power receptacle corresponding to FIG. 3C, as the circuit breaker moves during the racking operation.

FIG. 4C is a top view of the platform in the circuit breaker, showing the example relative positions of the racking power plug and the racking power receptacle corresponding to FIG. 3C, as the circuit breaker moves during the racking operation. As the circuit breaker and platform 115 are moved by the racking motor 110, the racking power plug 116 is effectively pushed by the racking power receptacle 118 as the racking operation progresses.

Figure 3D:
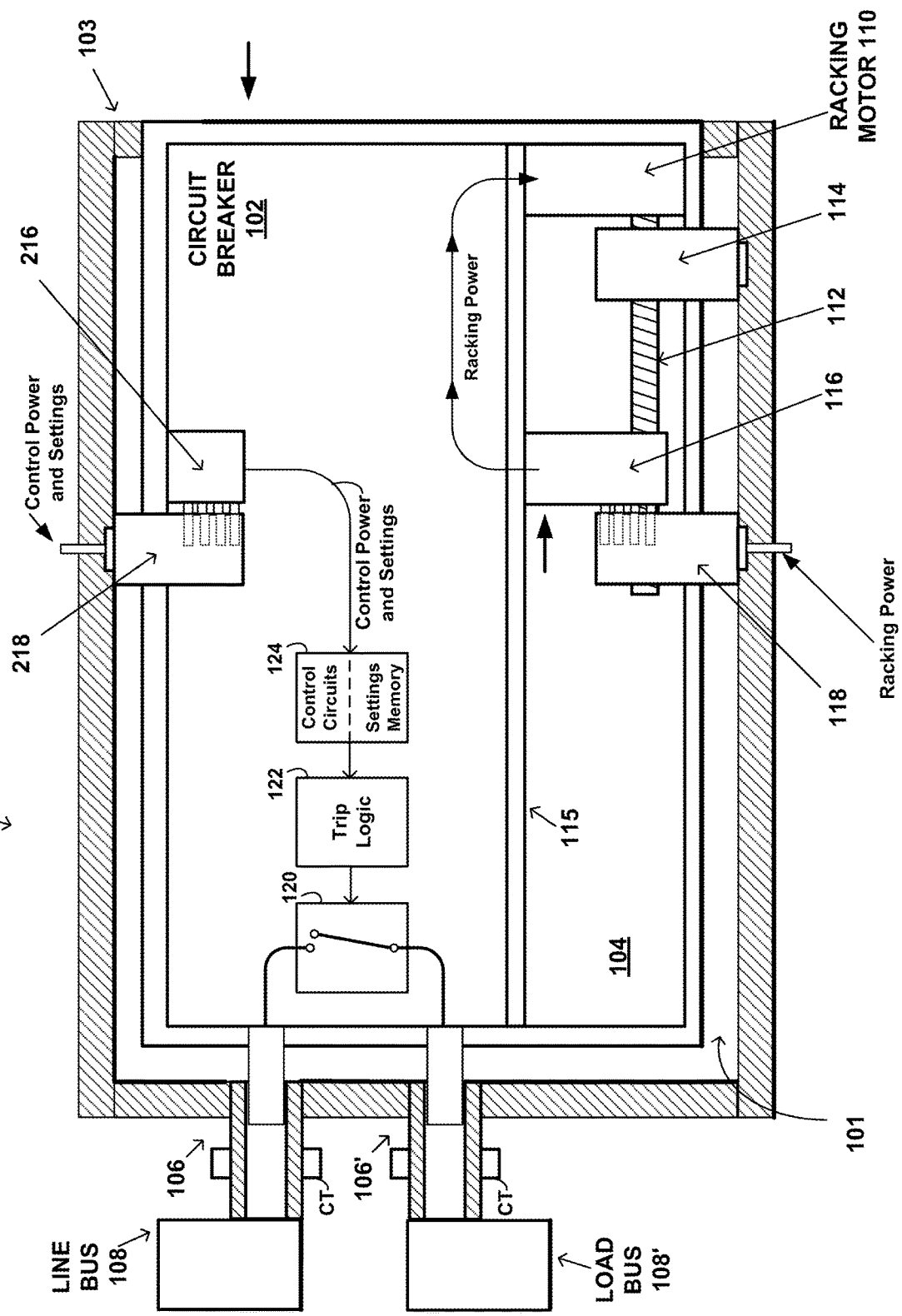
FIG. 3D is a side interior view of the example circuit breaker of FIG. 3C in the connected position, showing the racking power plug continuing to be plugged into the racking power receptacle to continue powering the racking motor as the circuit breaker becomes fully racked with its primary contacts connecting with the main bus. The control power plug is shown connected to the stationary control power receptacle upon reaching the connected position.

FIG. 3D is a side interior view of the example circuit breaker of FIG. 3C, showing the racking power plug 116 continuing to be plugged into the racking power receptacle 118 to continue powering the racking motor 110 as the circuit breaker 102 becomes fully racked with its line side primary contact 106 connected to the main line bus 108 and the load side primary contact 106' connected to the main load bus 108'.

The example control power plug 216 is configured to connect to the control power receptacle 218 when the racking motor 110 has racked the circuit breaker 102 into the connected position of FIG. 3D and the racking operation is completed. The control power plug 216 and the connected control power receptacle 218 form the path to conduct control power to the control circuits 124 in the circuit breaker 102 and to exchange control signals between the control circuits 124 and testing or other equipment. The control power plug 216 is also configured to convey signals for settings and other control information to the settings memory 124 and the trip logic 122, when it is connected to the control power receptacle 218.

Figure 4D:
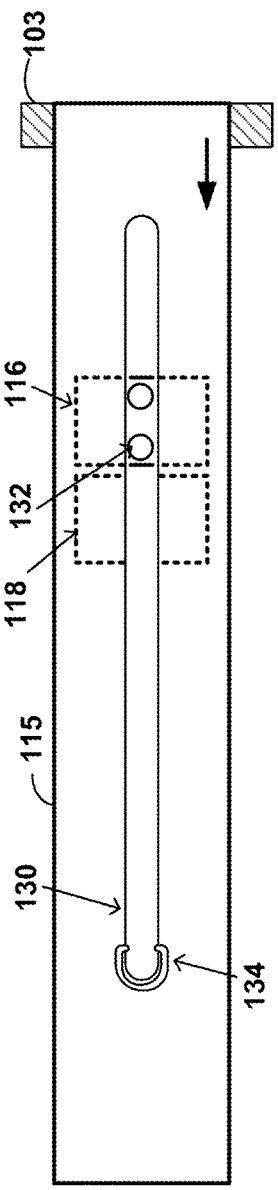
FIG. 4D is a top view of the platform in the circuit breaker, showing the example relative positions of the racking power plug and the racking power receptacle corresponding to FIG. 3D as the circuit breaker becomes fully racked in the contact position with its primary contacts connecting with the main bus.

FIG. 4D is a top view of the platform in the circuit breaker, showing the example relative positions of the racking power plug 116 and the racking power receptacle 118 corresponding to FIG. 3D as the circuit breaker becomes fully racked with its primary contacts 106 and 106' connecting with the main bus 108 and 108'. The connection of the primary contacts of the circuit breaker to the main bus is with a primary electrical plug or stabs in the circuit breaker.

FIG. 5B is a top cross sectional view along the section line 5-5A of FIG. 1, showing the second example embodiment of the racking mechanism 104 in the circuit breaker 102, with the racking power receptacle 118 and the threaded anchor 114 positioned closer to the front 103 of the switchgear cabinet 100, to enable connecting the racking power plug 116 to the racking power receptacle 118 as soon as the circuit breaker 102 is inserted into the breaker compartment 101 of the switchgear cabinet 100.

Figure 6:
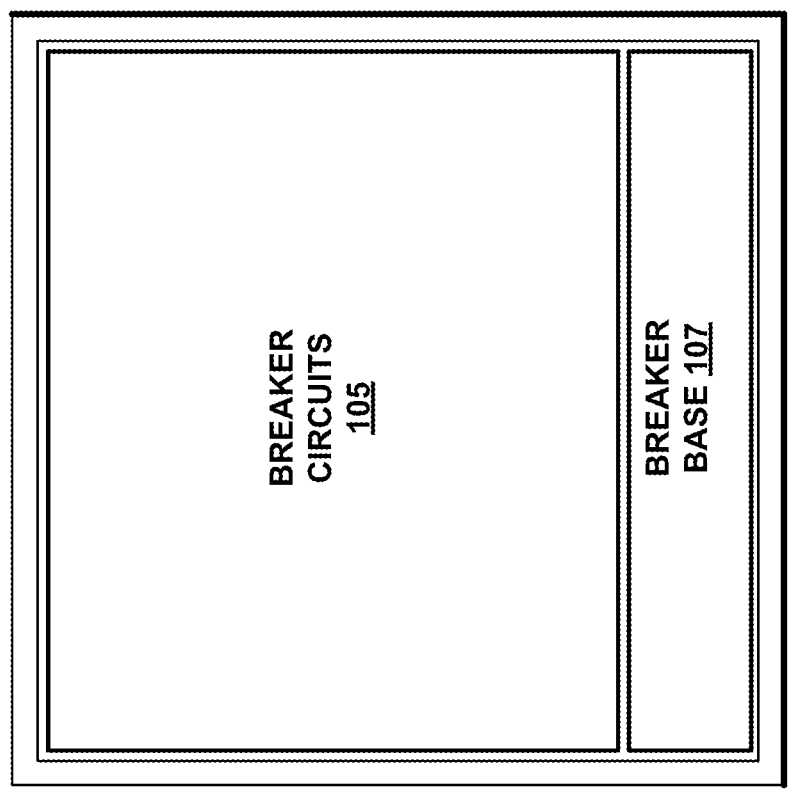
FIG. 6 illustrates an alternate embodiment in a front, overall view of the example switchgear cabinet, example circuit breaker comprising breaker circuits and breaker base that is an integral part of the circuit breaker.

FIG. 6 illustrates an alternate embodiment in a front, overall view of the example switchgear cabinet 100, example circuit breaker 102 comprising breaker circuits 105 and breaker base 107 that is an integral part of the circuit breaker 102.

Figure 7:
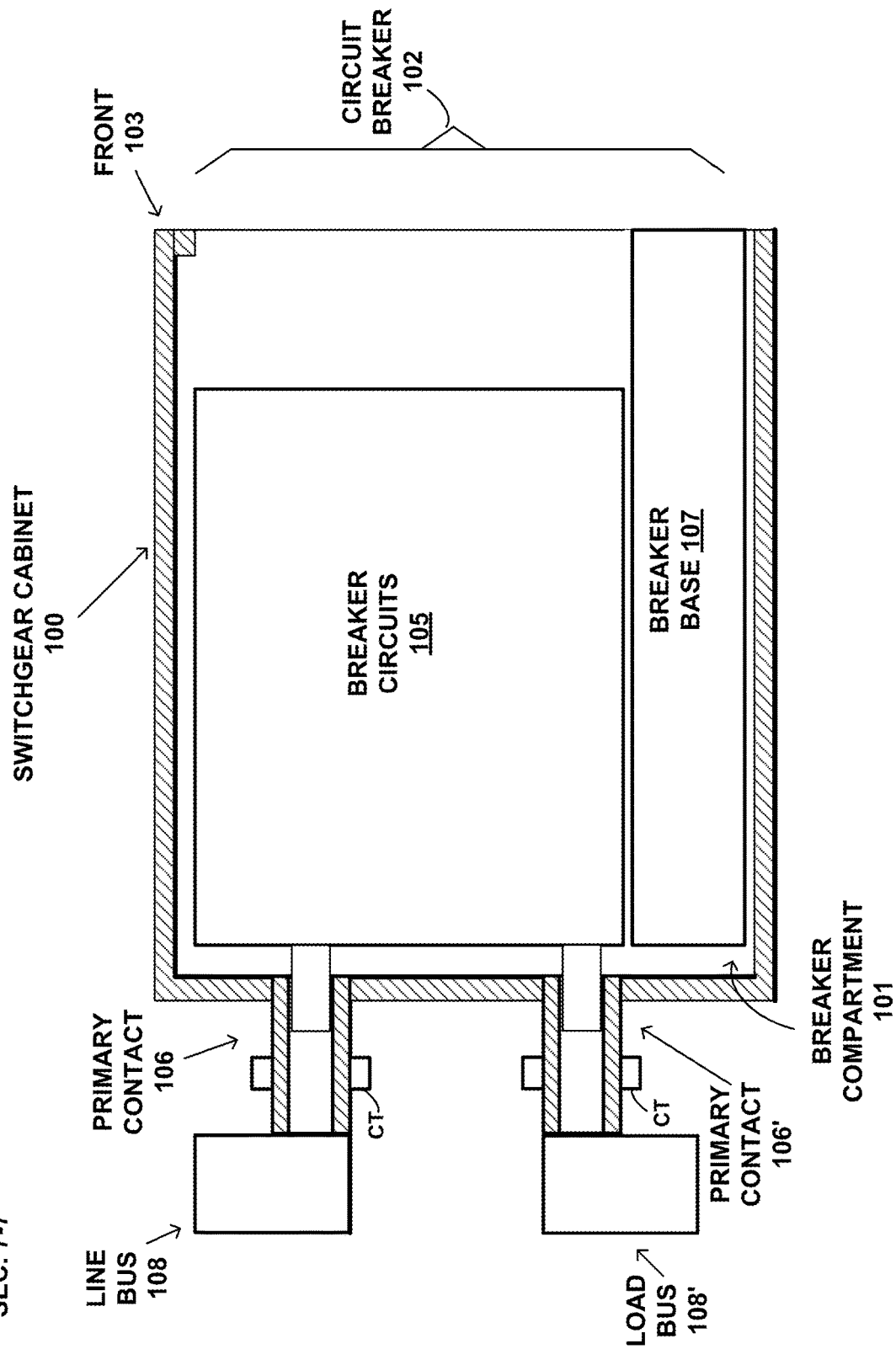
FIG. 7 is a side view along the section line 7-7' of the alternate embodiment of FIG. 6, illustrating the example breaker compartment of the switchgear cabinet, circuit breaker comprising breaker circuits and breaker base, primary contacts to the main bus that is an integral part of the circuit breaker.

FIG. 7 is a side view along the section line 7-7' of the alternate embodiment of FIG. 6, illustrating the example breaker compartment 101 of the switchgear cabinet 100, circuit breaker 102 comprising breaker circuits 105 and breaker base 107 that is an integral part of the circuit breaker 102, and primary contacts 106 and 106' to the main bus 108, 108'.

FIG. 8A is a side view along the section line 8A-8A' of the alternate embodiment of FIG. 6, of the example circuit breaker 102 comprising breaker circuits 105 and breaker base 107, inside of the circuit breaker 102. The racking motor 110 is fastened to the breaker base 107. The moveable carrier 109 is fastened to the bottom of the housing of the breaker circuits 105. The racking screw 112 is driven into rotation by the racking motor 110 to engage threads within the moveable carrier 109 and move the moveable carrier 109 and the breaker circuits 105 either toward or away from the contact position of the primary contacts 106 and 106' to the main bus 108, 108'. The racking power plug 116 is fastened to the breaker base 107. The racking power receptacle 118 is fastened to the switchgear cabinet 100. The initial position of the racking power plug 116 is shown in FIG. 8A before it connects to the racking power receptacle 118 when the circuit breaker 102 is initially inserted by a technician into the breaker compartment 101. The control power plug 216 is fastened to the top of the housing of the breaker circuits 105. The stationary control power receptacle 218 is fastened to the switchgear cabinet 100. The control power plug 216 remains disconnected from the stationary control power receptacle 218 while the breaker circuits 105 of the circuit breaker 102 moves within the breaker compartment 101 during the racking operation. Upon reaching the connected position of FIG. 8C, the control power plug 216 becomes connected to the stationary control power receptacle 218.

FIG. 8B is a side interior view of the example circuit breaker 102 of the alternate embodiment of FIG. 8A, showing the position of the circuit breaker 102 when the technician has adjusted the position of the breaker base 107, enabling the racking power plug 116 to automatically connect to the stationary racking power receptacle 118, where it can begin to apply racking power to the racking motor 110. The breaker base 107 may be latched to the switchgear cabinet 100 at this point. The racking power plug 116 remains stationary with respect to the breaker compartment 101 as the breaker circuits 105 move with respect to the compartment 101, since the racking power plug 116 is now connected to the stationary racking power receptacle 118. The racking screw 112 mates with the moveable carrier 109, which begins advancing the breaker circuits 105 in the motorized racking operation. The control power plug 216 mounted in the moving breaker circuits 105, is shown remaining disconnected from the stationary control power receptacle 218.

FIG. 8C is a side interior view of the example circuit breaker 102 of the alternate embodiment of FIG. 8B in the connected position, showing the racking power plug 116 continuing to be plugged into the racking power receptacle 118 to continue powering the racking motor 110 as the circuit breaker 102 becomes fully racked with its primary contacts 106 and 106' connecting with the main bus 108 and 108'. The control power plug 216 is shown connected to the stationary control power receptacle 218 upon reaching the connected position.

FIG. 9A is a top cross sectional view along the section line 9-9A of the alternate embodiment of FIG. 6, showing the first example embodiment of the breaker base 107 in the circuit breaker 102 when it is inserted into the switchgear cabinet 100, with the position of the racking motor 110 close to the front end of the breaker base 107 to thereby push the breaker circuits 105 toward the connected position of the circuit breaker 102, corresponding to FIG. 8A.

FIG. 9B is a top cross sectional view along the section line 9-9A of the alternate embodiment of FIG. 6, showing a second example embodiment of the breaker base 107 in the circuit breaker 102, with the racking motor 110 positioned close to the back end of the breaker base 107, to thereby pull the breaker circuits 105 toward the connected position of the circuit breaker 102, corresponding to FIG. 8A.

The resulting apparatus and system provide a motorized breaker arrangement that powers-up the motor when the breaker is inserted into the cabinet and remains powered up when the breaker is in either a disconnected position or connected position, without having to manually connect plugs.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A racking system for a circuit breaker, comprising:
a racking motor mounted in a circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
a control power plug mounted in the circuit breaker, configured to conduct control power by connection to a control power receptacle mounted in the breaker compartment, when the racking motor has moved the circuit breaker into the connected position;
a racking power plug mounted in the circuit breaker, configured to conduct the racking power to the racking motor; and
a racking power receptacle mounted at a stationary position in the breaker compartment, configured to automatically connect with the racking power plug when the circuit breaker is inserted into the breaker compartment, to provide the racking power to the racking motor through the connected racking power plug;
wherein the racking power plug is further configured to remain connected and stationary relative to the racking power receptacle while the circuit breaker moves within the breaker compartment during a racking operation and after the circuit breaker reaches the connected position.

2. The racking system of claim 1, wherein the circuit breaker moves relative to the racking power plug when the racking power plug is connected to the stationary racking power receptacle while the circuit breaker moves within the breaker compartment during the racking operation, and the racking power plug remains connected to the racking power receptacle after reaching the connected position.

3. The racking system of claim 1, wherein the control power plug mounted in the circuit breaker moves relative to and remains disconnected from the control power receptacle mounted in the breaker compartment while the circuit breaker moves within the breaker compartment during the racking operation prior to reaching the connected position where the control power plug becomes connected to the control power receptacle.

4. The racking system of claim 1, wherein the racking motor is configured to drive a racking linkage for racking the circuit breaker into the breaker compartment when provided with racking power via the racking power plug and the racking power receptacle.

5. The racking system of claim 1, wherein the racking power plug is configured to connect to the racking power receptacle when the circuit breaker enters the breaker compartment.

6. The racking system of claim 1, wherein the control power plug is accessible from outside the breaker compartment when the circuit breaker is drawn out from the breaker compartment.

7. The racking system of claim 1, wherein the connection of the primary contacts of the circuit breaker to the main bus is with primary stabs in the circuit breaker when the racking motor has moved the circuit breaker into the connected position.

8. A circuit breaker, comprising:
a racking motor mounted in the circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
a control power plug mounted in the circuit breaker, configured to conduct control power by connection to a control power receptacle mounted at a stationary position in the breaker compartment, when the racking motor has moved the circuit breaker into the connected position;
a racking power plug mounted in the circuit breaker, configured to conduct the racking power to the racking motor by connection to a racking power receptacle mounted at a stationary position in the breaker compartment;
wherein the racking power plug is further configured to remain connected and stationary relative to the racking power receptacle while the circuit breaker moves within the breaker compartment during a racking operation and after the circuit breaker reaches the connected position.

9. The circuit breaker of claim 8, wherein the circuit breaker moves relative to the racking power plug when the racking power plug is connected to the stationary racking power receptacle while the circuit breaker moves within the breaker compartment during the racking operation, and the racking power plug remains connected to the racking power receptacle after reaching the connected position.

10. The circuit breaker of claim 8, wherein the control power plug mounted in the circuit breaker moves relative to and remains disconnected from the control power receptacle mounted in the breaker compartment while the circuit breaker moves within the breaker compartment during the racking operation prior to reaching the connected position where the control power plug becomes connected to the control power receptacle.

11. The circuit breaker of claim 8, wherein the racking motor is configured to drive a racking linkage for racking the circuit breaker into the breaker compartment when provided with racking power via the racking power plug and the racking power receptacle.

12. The circuit breaker of claim 8, wherein the racking power plug is configured to connect to the racking power receptacle when the circuit breaker enters the switchgear cabinet.

13. The circuit breaker of claim 8, wherein the connection of the primary contacts of the circuit breaker to the main bus is with primary stabs in the circuit breaker when the racking motor has moved the circuit breaker into the connected position.

14. A racking system for a circuit breaker, comprising:
- a racking motor mounted in a circuit breaker, configured to move the circuit breaker into a breaker compartment for connection of primary contacts of the circuit breaker in a connected position to a main bus, the racking motor configured to drive a racking linkage for racking the circuit breaker into the breaker compartment when provided with racking power;
- a first control power connector mounted in the circuit breaker, configured to conduct control power by connection to a second control power connector mounted at a stationary position in the breaker compartment, when the racking motor has moved the circuit breaker into the connected position;
- a first racking power connector mounted in the circuit breaker, configured to conduct the racking power to the racking motor; and
- a second racking power connector mounted at a stationary position in the breaker compartment, configured to automatically connect with the first racking power connector when the circuit breaker is inserted into the breaker compartment, to provide the racking power to the racking motor through the connected first racking power connector;
- wherein the first racking power connector is further configured to remain connected and stationary relative to the second racking power connector while the circuit breaker moves within the breaker compartment during a racking operation and after the circuit breaker reaches the connected position.

15. The racking system of claim 14, wherein the circuit breaker moves relative to the first racking power connector when the first racking power connector is connected to the second racking power connector mounted at its stationary position in the breaker compartment.

16. The racking system of claim 14 wherein the first control power connector mounted in the circuit breaker moves relative to the second control power connector while the circuit breaker moves within the breaker compartment during the racking operation prior to reaching the connected position.

17. The racking system of claim 14, wherein the racking motor is configured to drive a racking linkage for racking the circuit breaker into the breaker compartment when provided with racking power via the first racking power connector and the second racking power connector.

18. The racking system of claim 14, wherein the first racking power connector is configured to connect to the second racking power connector when the circuit breaker enters the breaker compartment.

19. The racking system of claim 14, wherein the first control power connector is accessible from outside the breaker compartment when the circuit breaker is drawn out from the breaker compartment.

20. The racking system of claim 14, wherein the connection of the primary contacts of the circuit breaker to the main bus is with primary stabs in the circuit breaker when the racking motor has moved the circuit breaker into the connected position.

\* \* \* \* \*